(No Model.)
M. HANSON.
AUTOMATIC GRAIN MEASURER.
No. 601,140. Patented Mar. 22, 1898.
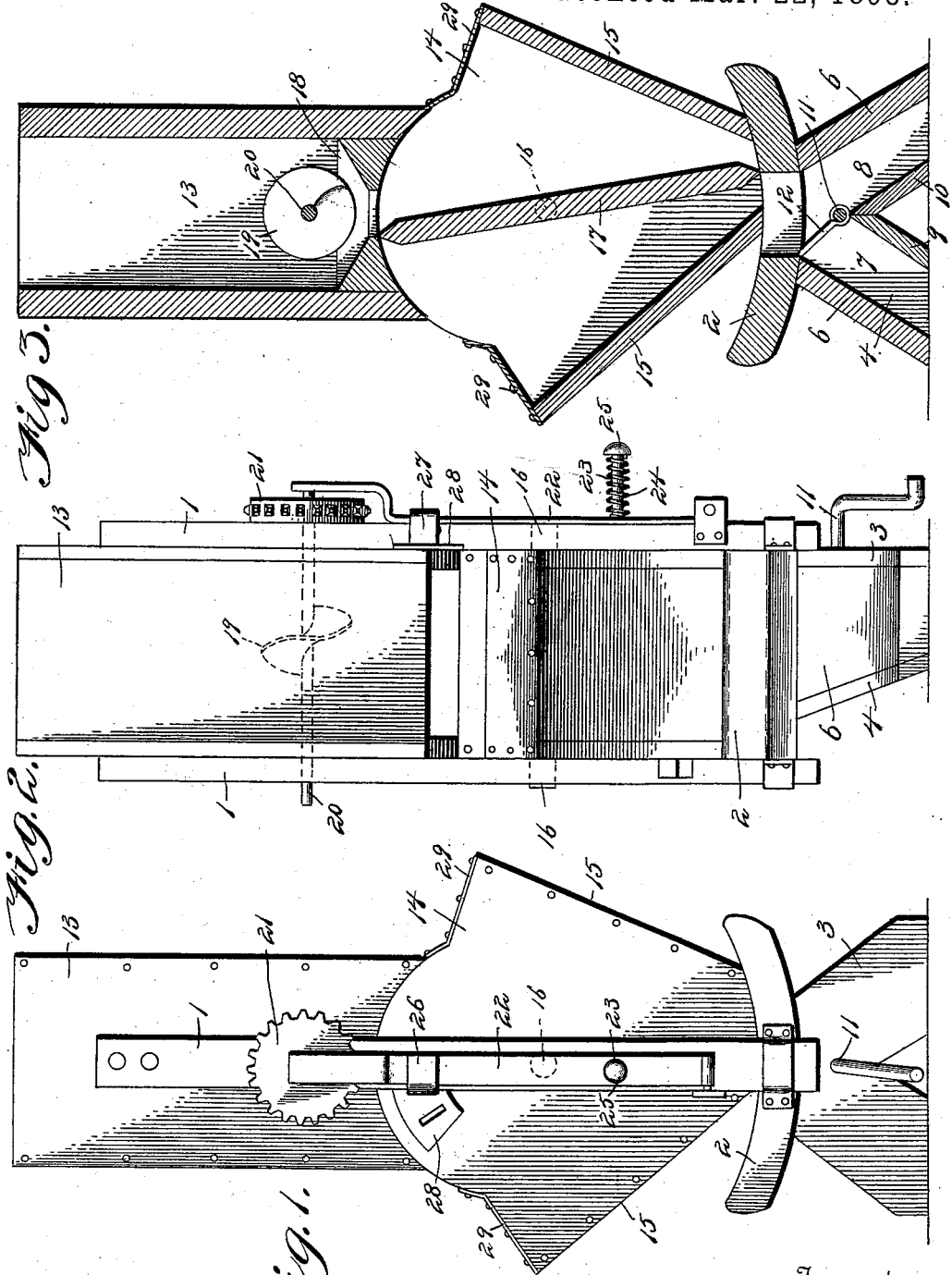
Witnesses
Milton O'Connell,
Victor J. Evans
Inventor
Maurice Hanson,
By John Wedderburn, Attorney

UNITED STATES PATENT OFFICE.

MAURICE HANSON, OF SWENODA, MINNESOTA.

AUTOMATIC GRAIN-MEASURER.

SPECIFICATION forming part of Letters Patent No. 601,140, dated March 22, 1898.

Application filed May 19, 1897. Serial No. 637,135. (No model.)

*To all whom it may concern:*

Be it known that I, MAURICE HANSON, of Swenoda, in the county of Swift and State of Minnesota, have invented certain new and useful Improvements in Automatic Grain Measurers and Baggers; and I do hereby declare the following to be a full, clear, and exact description of the invention, such as will enable others skilled in the art to which it appertains to make and use the same.

The invention relates to an automatic grain-measurer, combined with a bagging-chute for measuring and bagging the grain as it comes from the separator or other source of supply.

It will be understood from the following description and claims, reference being had to the accompanying drawings, in which—

Figure 1 shows the improved measurer in front elevation. Fig. 2 is a side elevation of the same, and Fig. 3 represents a vertical transverse section through the measuring and bagging chutes.

1 1 indicate uprights secured at their lower ends to a perforated bottom board 2, which rests upon and is secured to front and rear boards 3 4, having diverging sides covered by inclined boards or plates 6 6, forming the outer walls of the two diverging chutes 7 8, separated in their lower ends by diverging inner wall-boards 9 10. The upper edges of these boards are brought together, giving them the inverted-V shape indicated in the cross-section. At said edges is a rock-shaft 11, journaled at its ends in the front and rear plates 3 4 and provided on its forward end with a crank-arm, by means of which said shaft will be vibrated. The shaft 11 carries a flap-valve 12, adapted to be swung to cover either of the chutes for directing the grain into the other chute, to the lower end of which a bag may be applied for receiving the grain until the required amount has been deposited therein, when the valve can be turned to cover said chute, deflecting the descending grain into the opposing chute, which in the meantime has been supplied with a bag for receiving the grain therefrom.

Between the upper ends of the uprights 1 1 is secured the lower end of the chute 13, adapted to receive the grain directly from the grain-separator or any other suitable source of supply. The front and rear walls of the chute are made concave in form on their lower ends, and under them are arranged the front and rear walls of the grain-measuring box or chamber 14, said box being provided with sides 15, converging toward their lower ends, as shown. The lower ends of the front and rear walls of the box 13 are rounded to move in close proximity with the perforated base-plate 2, through which the grain passes to the bagging-chutes. The box is provided in its front and rear wall-plates with pivots 16, which have bearings in the uprights 1 1, permitting the box to be vibrated laterally.

The box or measuring-chamber is divided longitudinally, or from front to rear, by an upright board 17, which moves in close contact with the hopper-shaped chute 13 for adapting the opposite sides of the box to receive the grain alternately from said chute. The bottom of the chute, as stated, is made hopper-shaped, or with converging sides and ends, as indicated at 18, and above said hopper-shaped bottom is mounted a feed-screw 19, fast upon a shaft 20, journaled at its ends in the uprights 1 1 in such manner as to adapt it to slide longitudinally therein. The forward end of this shaft has fast upon it the band or sprocket wheel 21, through which it receives motion from any suitable drive chain or belt connecting it with a corresponding sprocket or band wheel on the grain-separator or other suitable motor. The forward end of this shaft 20, projecting beyond the sprocket or band wheel 21, rests in contact with the upper end of the bar 22, which at its lower end is pivoted to the forward upright 1. The bar 22 is perforated at a point intermediate its ends, and a pin 23, engaged with the outer face of the upright 1, passes through said perforation and is surrounded by a spring 24, interposed between the bar 22 and the head 25 of the pin, for holding the bar in contact with the shaft 20 with a yielding pressure. The bar 22 near its upper end has an angle-iron 26 secured to it, the arm 27 of which projects inward toward the measuring box or chamber 14, which is provided near its upper swinging end on its forward face with a notched plate 28, with which the arm or spur 27 is adapted to engage at either end of the throw of the vibrating measuring-box. The crank-arm on the rock-shaft 11, carrying the valve 12, may be connected by any suitable rod with a pin on the vibrating box or chamber 14, so that as the latter is vibrated the valve 12 will be correspondingly vibrated for changing the delivery of the grain from one bagging-chute to the other, thereby rendering the valve 12 automatic in its action.

29 29 indicate cover-plates covering the inclined upper faces of the measuring box or chamber projecting from the chute 13.

The operation of the box will be readily understood. The grain is fed into the measuring-box 14 by the feed-screw 19, and as soon as the compartment thereof receiving the grain becomes filled the pressure of the grain upon the feed-screw forces the shaft forward, lifting the spur 27 out of engagement with the rack-plate 28 on the front of the hopper, when the weight of the grain, filling one compartment of said measuring-box, serves to vibrate the box into position to cause the other compartment thereof to receive the grain, while the first-named compartment is discharged of its contents. The relief of pressure upon the feed-screw serves to allow the latter to be retracted for allowing the spur 27 again to engage the rack 28 in its changed position until the second compartment is filled and the chamber again released for allowing it to resume the first-named position.

By the construction described a very simple and effective grain measuring and bagging device is provided, and one which is not liable to get out of order.

Having thus described the invention, what I claim as new, and desire to secure by Letters Patent, is—

1. In a grain-measurer, the combination with a divided grain-measuring box or chamber pivotally connected with its supporting-frame, of a feed-chute for supplying grain to said chamber, a shaft arranged to slide endwise in bearings in the lower end of said chute, a screw fast on said shaft for imparting an endwise movement thereto, and a yielding plate bearing against and acted upon by the endwise movement of said shaft and carrying a spur engaging a rack-plate on the pivoted grain-box, substantially as and for the purpose described.

2. In a grain-measurer, the combination of a divided, pivoted and vibrating box or chamber, a grain-chute communicating therewith, a shaft movable endwise in bearings in the discharge end of said chute, a screw fast on said shaft for imparting endwise movement thereto, a pivoted, yielding bar bearing against one end of said shaft, a rack-plate on the vibrating box, and a spur on said yielding bar for engaging said rack, all substantially as described.

In testimony whereof I have signed this specification in the presence of two subscribing witnesses.

MAURICE HANSON.

Witnesses:
 M. A. OVERLIE,
 H. P. HALVERSON.